United States Patent [19]
Lloyd

[11] 3,709,098
[45] Jan. 9, 1973

[54] MOTION TRANSMITTING APPARATUS

[76] Inventor: Wayne B. Lloyd, 214 Brookside Drive, Baltimore, Md. 21228

[22] Filed: Feb. 3, 1971

[21] Appl. No.: 112,229

[52] U.S. Cl. ................91/46, 92/127, 92/136, 92/156
[51] Int. Cl. ..............................F01m 1/04
[58] Field of Search........92/127, 156, 160, 158, 154, 92/136, 165, 159; 91/46; 308/5

[56] References Cited

UNITED STATES PATENTS

| | | | |
|---|---|---|---|
| 2,907,304 | 10/1959 | Macks | 305/5 X |
| 3,019,771 | 2/1962 | Heese et al. | 92/136 X |
| 3,142,262 | 7/1964 | Firth et al. | 92/127 X |
| 3,288,035 | 11/1966 | Ryzner | 92/136 X |
| 3,338,140 | 8/1967 | Sheesley | 92/136 X |
| 3,447,423 | 6/1969 | Henry | 92/136 X |
| 3,585,906 | 6/1971 | Kraakman | 92/127 |

*Primary Examiner*—Martin P. Schwadron
*Assistant Examiner*—Irwin C. Cohen
*Attorney*—F. Shapoe and Lee P. Johns

[57] ABSTRACT

Apparatus of the rack and pinion type of hydraulic actuator having low back-lash and friction for converting hydraulic power by a linear to a rotary motion mechanism employing valved hydrostatic lubrication means responsive to the hydraulic pressure to hydraulically support and lubricate the rack with respect to a rack supporting bearing and employing as the lubricant the hydraulic fluid used for transmitting the power.

1 Claim, 3 Drawing Figures

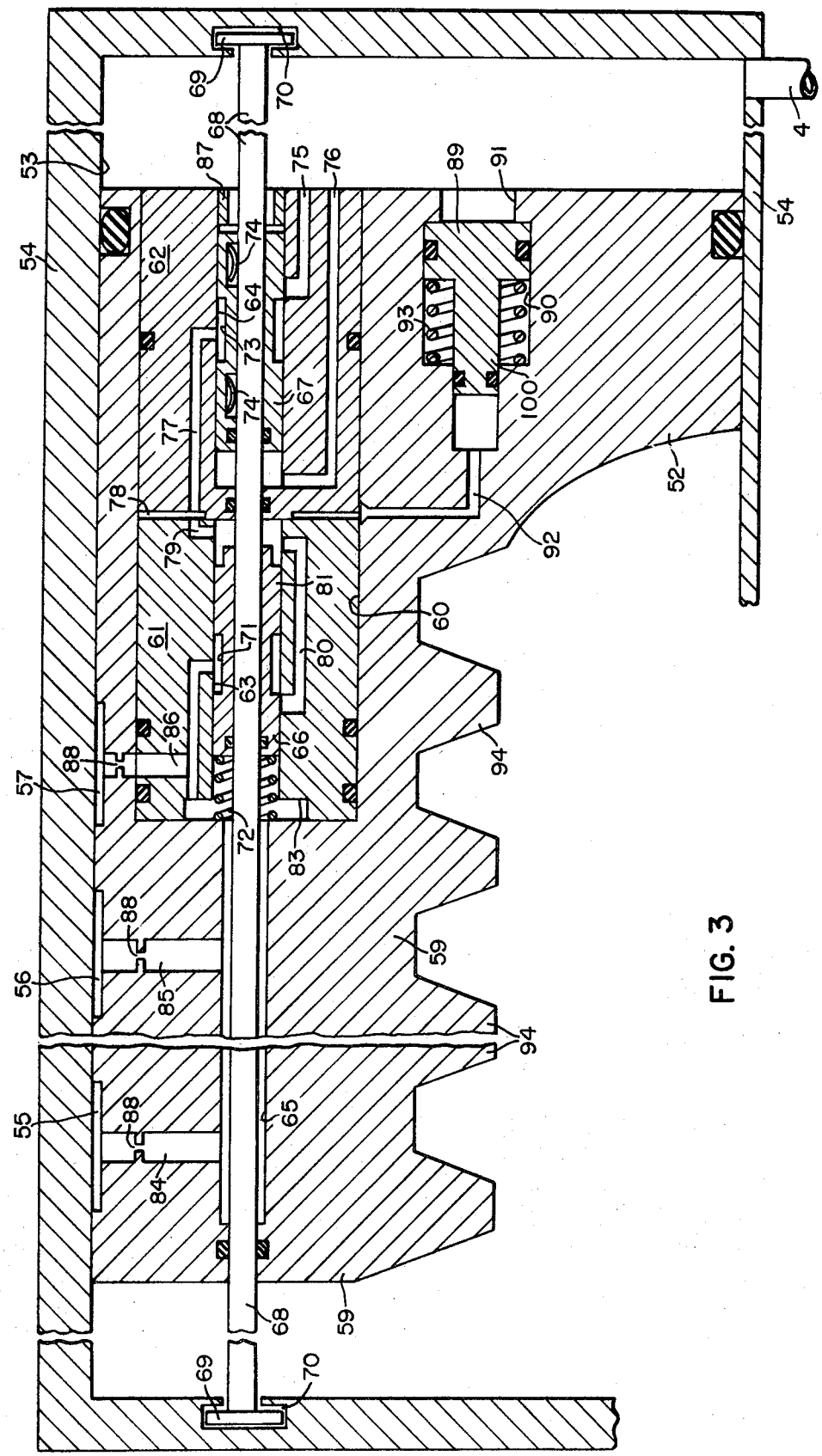

MOTION TRANSMITTING APPARATUS

BACKGROUND OF THE INVENTION

1. Field of the Invention

This invention relates to rotary hydraulic actuators of the rack and pinion type such as used in manipulators requiring high torque and accuracy of operation.

2. Description of the Prior Art

The rack and pinion type of hydraulic actuator is used for various applications where the conversion of hydraulic power to rotary motion is necessary. One primary advantage of such actuators is the high torque developed. A disadvantage, however, has been the relatively low accuracy of operation which has precluded use of such actuators in precise servo applications such as radar antenna drives. The reasons for that disadvantage have been high friction (low efficiency) and the backlash particularly in double acting units. Low accuracy however has been accepted in many applications of such actuators because of the advantages of large angular travel, zero cross port leakage, ruggedness, and relatively low cost. Thus, in spite of its shortcomings, the rack and pinion actuator is presently of considerable engineering and commercial importance.

One reason for the frictional disadvantages has been that when high loads are applied the reaction forces between the pinion and rack develop unusually high friction between the rack and its supporting bearing. Even when the rack is supported on the hydraulic piston which drives it, the hydraulic fluid used for power has a relatively low viscosity, and its presence in the housing at uniform pressure does not prevent metal-to-metal rubbing of the piston on the housing when high normal loads are present.

A search of the prior art has located the following U.S. Pat. Nos. 1,064,542, 2,495,516, 2,890,881, 2,923,342, 2,953,149, 3,092,083, 3,127,955, 3,288,035, 3,400,541, and 3,466,951. The disclosures of these patents, however, do not include valve means for controlling the flow of the hydraulic fluid to function as a lubricant for the bearing support for a rack, which valve means is responsive to the pressure of the hydraulic fluid.

SUMMARY OF THE INVENTION

It has been found in accordance with this invention that the foregoing disadvantages in a hydraulically operated rack and pinion linear to rotary converting mechanism may be overcome by providing for hydrostatic lubrication at the interface of the rack support bearing surfaces and employing means including a servo valve by which the hydraulic fluid is directed to the specific bearing interface during operation of the hydraulic mechanism to support and lubricate the rack bearing under load to minimize friction and substantially eliminate backlash.

BRIEF DESCRIPTION OF THE DRAWING

FIG. 3 is an enlarged fragmentary sectional view through a different type of hydrostatic lubricating means for an actuator.

DESCRIPTION OF THE PREFERRED EMBODIMENTS

Figure 1:
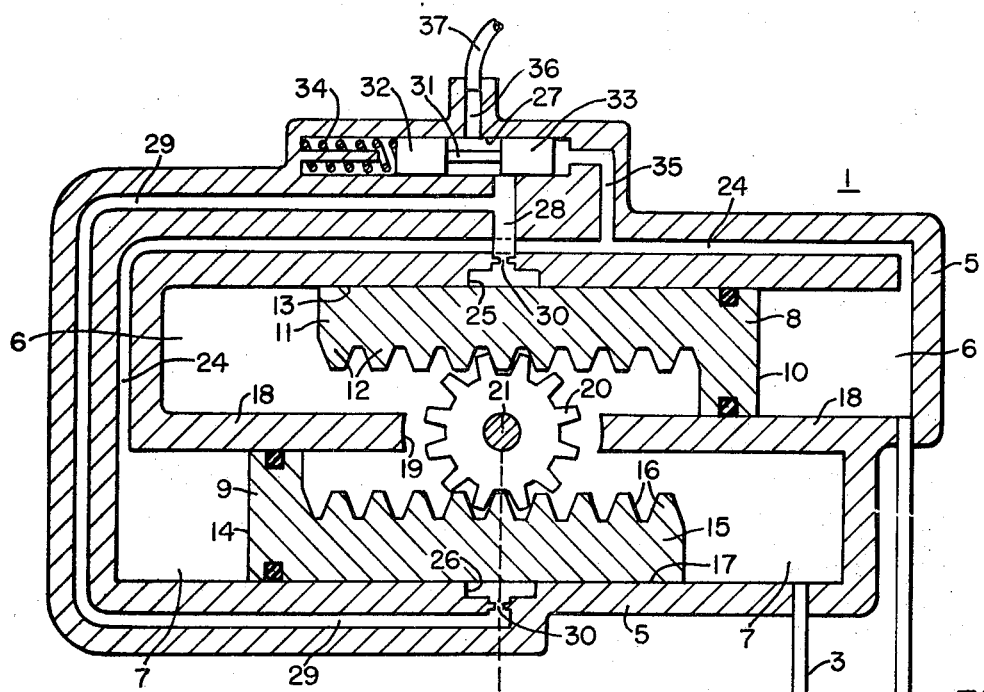
FIG. 1 is a sectional view of a double acting rack and pinion rotary actuator.

In FIG. 1 an actuator is generally indicated at 1 and a servo valve generally indicated at 2 with a pair of interconnecting conduits 3 and 4 therebetween.

The actuator 1 includes a housing 5 which provides a pair of hydraulic chambers 6 and 7 in which pistons 8 and 9, respectively, are disposed. The piston 8 includes a head surface 10 and an elongated body portion 11 which is integral with the piston and which is provided with teeth forming a rack 12. The upper surface of the piston 8 and body portion 11 is in sliding engagement with the upper surface of the chamber 6 forming a bearing interface 13.

Similarly, the piston 9 includes a head surface 14, a body portion 15, a rack 16, and has a lower surface in sliding engagement with the lower portion of the wall of the chamber 7 forming a bearing interface 17. A partition portion 18 in housing 5 is a common wall between the chambers 6 and 7. An opening 19 in the partition portion 18 is provided to accommodate a pinion 20 mounted on a pinion shaft 21, the outer end portions of which extend through opposite side walls of the housing 5 in which they are journally mounted.

As shown in FIG. 1, a rod 22 if fixedly mounted on and rotates with one end portion of the shaft 21 for movement in a clockwise or counterclockwise direction for any purpose such as lifting a schematically indicated load 23. The pinion 20 engages the racks 12 and 16 so that movement of the piston 8 to the left (as viewed in FIG. 1) and the piston 9 to the right causes the rod 22 to rotate in the counterclockwise direction. Conversely, movement of the pistons 8 and 9 to the right and left, respectively, causes the rod 22 to rotate in the clockwise direction.

As shown in FIG. 1, the upper end of the conduit 3 communicates with the chambers 6 and 7 on the side of the pistons 8 and 9 opposite their head surfaces 10 and 14. The upper end of the conduit 4 communicates with the chamber 6 on the side of the head surface 10 of piston 8. Passage means 24 in the housing 5 conveys hydraulic fluid from the chamber 6 and communicate with the portion of the chamber 7 adjacent the head surface 14 of the piston 9. Accordingly, application of pressurized hydraulic fluid through the valve 2 into the conduit 3 drives the piston 8 to the right and the piston 9 to the left. Conversely, application of pressurized hydraulic fluid through the conduit 4 drives the piston 8 to the left and the piston 9 to the right.

The actuator 1 includes a pair of recesses or lift pads 25 and 26 in the walls of the housing forming the chambers 6 and 7, respectively. The recesses 25 and 26 provide for lubrication of the interfaces 13 and 17 during movement of the pistons 8 and 9. For that purpose the recesses 25 and 26 communicate with a lubricant control valve chamber 27 through passage means 28 and 29. Similar fluid-restrictive openings or compensating orifices 30 are disposed in each of the passage means 28 and 29 and adjacent to the recesses 25 and 26. The purpose of the orifices 30 is to reduce the flow and pressure of the hydraulic fluid as it enters the recesses 25 and 26.

A lubricant control valve 31 of spool shape having spaced lands 32 and 33 is located in the valve chamber 27 and a preloaded coil spring 34 is disposed in one end of the chamber and abutting the land 32. The other end of the chamber 27 communicates with a passage 35 which extends to and connects with the passage means 24 where, upon application of sufficient hydraulic pressure, the valve 31 is driven against the spring 34 to close the upper end of the passage means 28 to prevent hydraulic fluid from entering the recesses 25 and 26. In the neutral or open position of the valve 31, as shown in FIG. 1, hydraulic fluid enters the passage means 28 from the valve chamber 27 where the fluid is introduced via a port 36 which communicates with a conduit 37 that leads to a source of pressurized hydraulic fluid (not shown).

The servo valve 2 is controlled by an electrical signal and has a hydraulic output in which the output varies according to the level of the electric signal employed for controlling it such as is disclosed in U.S. Pat. No. 3,400,541. The valve 2 employs a torque motor generally indicated at 38, within a housing 39 to control a pilot pressure first stage for establishing a pressure differential, in one direction or the other according to the direction of current flow, and across a double acting spool valve 40 to open up one or the other of the conduits 3 and 4 to spaced supply ports 41 and 42. Simultaneously, the other of the conduits to a return port 43 are opened to a degree in accordance with the pressure differential in the pilot pressure which in turn is dependent upon the level of electrical current supplied to the torque motor. The rate of supply of hydraulic fluid for operation of the actuator 1 in either direction is dependent upon the level and polarity of electrical currents supplied to the torque motor. A high current in the torque motor causes a greater displacement of the spool valve 40 in the selected direction and hence a wider opening of the respective supply and return communication of the conduits 3 and 4. A lesser current supplied to the torque motor reduces the degree of opening of the conduit lines to the supply and return ports 41, 42 and 43. The supply ports 41 and 42 communicate with the same or similar source of pressurized hydraulic fluid (not shown) as for the conduit 37. Movement of the spool valve 40 is opposed by a leaf spring 44, the lower end of which is attached at 45 to a jet pipe 46. The spring 44 feeds back to the first stage to establish equilibrium between the pressure differential called for by the torque motor and the position of the spool valve. The jet pipe 46 is employed in a first stage of the servo valve to direct hydraulic fluid from a supply line 47 (which communicates with the source of supply of hydraulic fluid) toward two receiver ports 48. When the jet pipe 46 is pivoted in one direction or another in an amount dependent upon the degree and polarity of the current furnished to a control winding 49 on an armature 50, the torque motor 38 creates a differential in the pressure between two receiver ports 48 and therefore across the spool valve 40. The resultant displacement of the spool valve 40 is to open one of the conduits 3 and 4 to the supply ports 41 or 42 while the other of the conduits serves as a return line to the return port 43. The flexing of the leaf spring 44 applies a force to the jet pipe at 45 which balances the torque motor force to maintain the proper pressure differential across the spool valve. Upon return of the valve and the torque motor to a neutral value, usually zero, the jet pipe 46 returns to a position for establishing a pressure condition across the spool valve to cause it to assume its mid-position (as shown) and thereby closing both supplied ports 41 and 42 as well as the return port 43.

In operation of the apparatus the lubrication fluid, being of the same substance as the hydraulic fluid, enters port 36 at a pressure which is preferably greater than the power hydraulic pressure. Greater pressure at the inlet port 36 is necessary so that the lubricant may flow into the bearing interfaces at the rack side of the chamber. If the pressure of the lubricant fluid is only equal to the power fluid hydrostatic lubrication will not exist when heavy loads are applied to the pinion 20.

To lift a load by counterclockwise rotation, the spool valve 40 moves to the right to admit hydraulic fluid to the piston head side of the chamber 6. The preload of the spring 34 prevents closure of the spool valve 31 unless the pressure of the hydraulic fluid in passage 24 is, say 125 percent of the supply pressure in passage 37. Thus, the rack 11 moves to the left with the combined lubricant flow and fluid in the pinion sides of chambers 6 and 7 being exhausted through the return port 43. The differential pressure between the lubricant fluid and the hydraulic fluid thereby accomplishes hydrostatic lubrication during the lifting operation, and a greater torque is exerted by the rack with a resulting increased load capacity.

To hold the load in the elevated position after the counterclockwise movement, the valve 40 returns to the neutral position as shown in FIG. 1. As a result the load torque forcibly rotates the pinion 20 clockwise thereby compressing the hydraulic fluid in the piston head portions of the chambers 6 and 7. Hydraulic fluid is thus trapped and a hydraulic locking occurs. However, the hydraulic fluid continues its flow into the pinion side of the chambers 6 and 7 through the recesses 25 and 26, which further increases the pressure of the hydraulic fluid in the piston head portions of the chambers 6 and 7. Were it not for the lubricant control valve 31 the pressure in the piston head portions would build up to at least twice the supply pressure, but the valve 31 is so arranged that it moves to the left when the piston head pressure is 125 percent, for example, of the lubricant supply pressure at the ports 37, 41 and 42. Thus, the valve 31 closes off the lubricant supply against the spring 34. Any tendency of the load to fall back is negligible because compression of the hydraulic fluid is slight, consequently there is no backlash between the rack and pinion or at the 0-rings in the pistons 8 and 9. To lower the load the valve 40 is moved to the left and lowering proceeds in a controlled manner with ideal rack lubrication for any load up to and including the maximum rated load.

To lift the load clockwise the pinion side of the chambers 6 and 7 is pressurized by moving the valve 40 to the left to admit hydraulic fluid to the pinion side of the chambers and the hydraulic fluid on the piston head sides of the chambers is exhausted through the return ports 43. The flow of the lubricant fluid into the recesses 25 and 26 with resultant leakage into the pinion side of the chambers 6 and 7 creates only a slight gain in the pressure therein. The pistons 8 and 9 move to the right and left respectively. Thus the clockwise lift proceeds with changing pressure differentials across the lubrication system but the differential is always great enough to provide lubrication. Where the pressure of the lubricant fluid and the hydraulic fluid are equal, lubrication ceases before the rated load is reached, but the benefits of ideal lubrication are available up to this point. To hold the load at the lifted position, the valve 41 is returned to the neutral position. However because lubrication continues to enter the system, the pistons 8 and 9 continue to travel slightly to compress the piston head volumes before the pistons comes to rest. The net effect is a slight overrun after the intended shutoff but the effect is very slight. The creep rate in the construction of this invention is minimum and much smaller than the conventional construction where hydraulic lubrication is absent. To lower the load from the clockwise lift position the spool valve 40 is moved to the right and lowering proceeds in a controlled manner with ideal rack lubrication.

Figure 2:
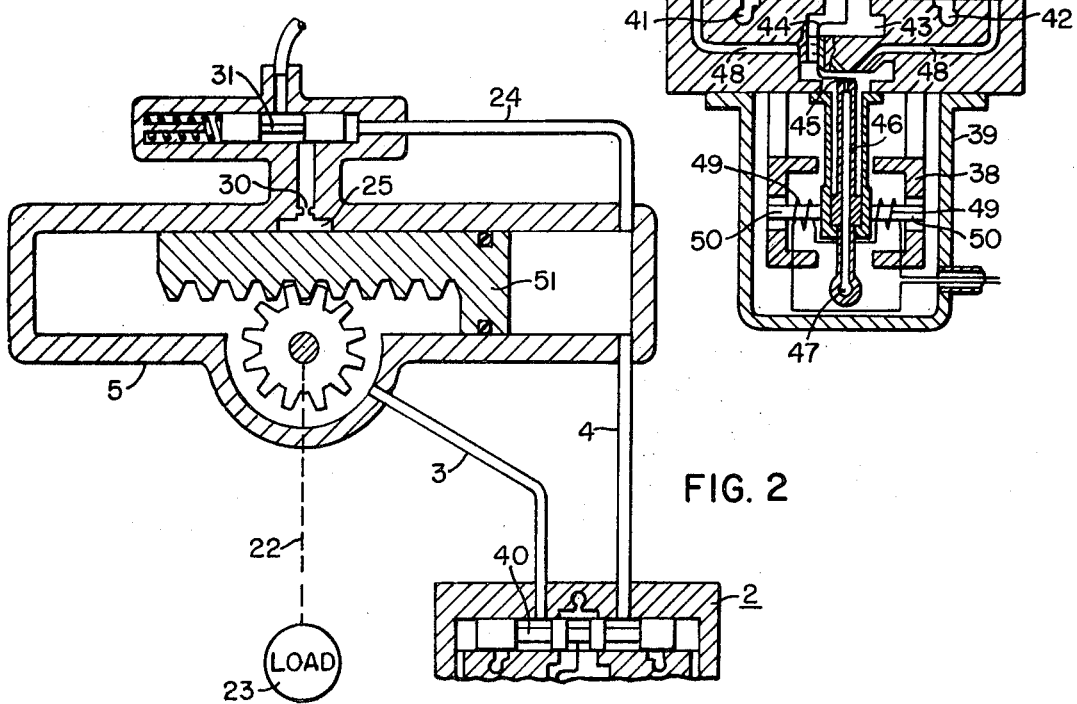
FIG. 2 is a vertical sectional view of a double acting single rack and pinion rotary actuator.

Another embodiment of the invention is shown in FIG. 2 in which a double acting single piston 51 is provided instead of the two pistons 8 and 9 as shown in FIG. 1. In all other respects the actuator of FIG. 2 resembles that of FIG. 1 and includes a spool valve 31 as well as a servo valve 2 having a spool valve 40 therein. In most respects the actuators of FIGS. 1 and 2 operate in a similar manner for moving a rod 22 in the clockwise or counterclockwise directions for any desired purpose.

Another embodiment of the invention is shown in FIG. 3 in which a piston 52 is disposed within a chamber 53 of a housing 54. The construction of the piston 52 as well as the housing 54 differs from those of FIGS. 1 and 2 in that the piston 52 is provided with a plurality, such as three, spaced recesses 55, 56, and 57 in the upper surface of a body portion 59 of the piston. Means for controlling the supply and pressure of the hydraulic fluid to the recesses 55, 56, and 57 are provided within the body of the piston and include a bore 60 with a pair of abutting plugs 61 and 62 seated therein. The plug 61 has a bore 63 and the plug 62 has a bore 64 which bores are aligned with a bore 65 in the left end portion of the body portion 59 of the piston 52. The spool valve 56 is disposed in the bore 63 and a spool valve 67 is disposed in the bore 64. A reference rod 68 extends through the spool valves 66 and 67 as well as the bore 65 and is retained in place in opposite ends of the chamber 53 in any suitable manner such as by providing each end of the rod with flanges 69 which are seated in similar slots 70 in the housing 54. The spool valve 66, having an annular recess 71, is retained in the position shown by a preloaded spring 72. The spool valve 67, having an annular recess 73, is provided with a pair of friction springs 74, whereby the spool is frictionally mounted on the rod 68.

The plug 62 includes a pair of passages 75 and 76 which extends between the chamber 53 and the bore 64. The plug 62 also includes a passage 77 which communicates between the bore 64 and an annular recess 78 at the left end of the plug 62. A passage 79 in the plug 61 extends between the recess 78 and the bore 63 and a passage 80 extends between two spaced portions of the bore 63 for circumventing a land 81 of the spool valve 66. Another passage 82 extends from the bore 63 to a recess 83 at the left end of the plug 61 which recess communicates with the bore 65. Passages 84, 85 and 86 are provided for communication between the recesses 55, 56, and 57, respectively, and the bore 65 and passage 82. The retainer ring 87 is disposed in the right end of the bore 64 for preventing the displacement of the spool valve 67 therefrom. Similar restrictive openings or compensating orifices 88 are provided in each of the passages 84, 85 and 86 near their respective recesses.

In addition, a restart piston 89 is disposed in a bore 90 having an opening 91 communicating with the chamber 53 and having a passage 92 extending from the left end of the bore to the bore 60 where communication is had with the recess 78. A preloaded spring 93 is provided in the bore 90 for holding the restart piston in position as shown.

After a counterclockwise lift the load 23 pushes piston head 52 to the right compressing fluid in chamber 53. The friction operated valve 67 is initially open, having been made so by the leftward motion of the piston 52 in the counterclockwise lift. Thus, a slight amount of creep occurs as the load forces the piston 52 to the right. However, the valve 67 lags the piston 52 (due to friction on rod 68) and slip flow through the passage 75 ceases as the right land of the spool 67 laps off the port of the end of passage 75. It should also be noted that the servo valve has closed off passage 4 and a true hydraulic lock has occurred.

If a second lift in the counterclockwise direction is made, the servo valve 2 allows fluid to enter passage 4 such that pressure $P_h$ becomes high enough to cause leftward motion of the piston 52. At this time there is no lubrication flow, because piston 52 moves before the friction actuated valve 67 can open to allow lubricant flow. To overcome this inability to lubricate on a restart situation, the restart piston 89 is provided. Its use is based on the fact that pressure $P_h$ is considerably higher during lift than during holding. That is true because friction of the extended piston 59 against the bore 53 is high during holding because of zero lubrication flow, and this aids in the holding, which reduces the pressure $P_h$ required to hold. However, the same friction resists a counterclockwise lift and makes $P_h$ much higher for lifting than for holding. The spring 93 preloads the piston 89 against its end stop so that a slight positive seating force occurs when $P_h$ is at the holding value. When $P_h$ is at the lifting value, the piston 89 unseats, moves to the left and causes fluid to be pumped out of the passage 92 by the reduced area piston 100. This pumping action although brief in duration provides lubrication flow to 55, 56, 57 such that the piston 52 can move slightly to the left thus establishing normal lubrication flow by means of valve 67. In terms of electrical analogy, the piston 89 is a bypass capacitor suitable only for transient operation. The reduced area piston 100 acts in conjunction with full area 89 to form a hydraulic intensifier. Thus a smaller excess of $P_h$ in lift over $P_h$ in holding can cause the necessary transient flow of lubricant for restart.

Accordingly, the several passages 84, 85, 86, the bores 65 and passages 82, 79, 77 and 75 comprise a fluid conducting conduit whereby hydraulic fluid is transferred from the chamber 53 to the recesses 55, 56 and 57.

In operation, the piston 52 moves to the left when pressurized hydraulic fluid is introduced into the chamber 53 through the conduit 4. As the piston moves the spool valve 67 tends to lag due to its frictional mounting on the rod 68, whereby the passage 75 is brought into communication with the recess 73 on the spool and enables the fluid to move therethrough and into the bore 63 of the plug 61. Where the fluid has sufficient access pressure to overcome the force of the spring 72, the spool valve 66 moves to the left thereby providing communication between the left end of the passage 80 and the recess 71 so that the hydraulic fluid enters the passages 82 and 86, the bore 65, and the passages 84 and 85. The spool 67 is not pressure actuated because the same pressure is applied to both ends thereof; however, the spool 66 is actuated by a pressure difference between the pressure at the right ends of the chamber 63 and a pressure on the rack side of the piston 52.

The flow of hydraulic fluid into the several recesses 55, 56, and 57 provides an ideal hydrostatic lubrication for the rack 94 as the load 23 (FIG. 1) is moved in the counterclockwise direction.

For holding the load in the elevated or lifted position the hydraulic fluid is trapped in the piston head volume by the valve 67 and is compressed by the load. Initially the valve 67 is open and a slight leakage may occur through the several passages. However, a slight motion of the rack with respect to the valve 67 closes off the flow of lubricant and results in a fixed position of the load in the lifted position.

To achieve a clockwise lift of the load the pinion case is pressurized on the rack side of the piston as shown in either FIG. 1, 2, or 3. As a result the hydraulic fluid tends to flow into the several recesses such as recesses 25 and 26 or the recesses 55, 56, and 57 in the reverse direction. However, the valve 31 (FIG. 1) or the valve 66 (FIG. 3) closes and prevents continued flow of the fluid which would otherwise result in an otherwise undesirable cross port leakage.

For the clockwise lift no hydrostatic lubrication exists. Accordingly, for the embodiment of the invention shown in FIG. 3 heaviest loads are lifted when the piston head side of the piston 52 is pressurized.

The check valve 66 also prevents creep when a clockwise lift is incurred.

Accordingly the device of the present invention provides advantage greater overall efficiency for all embodiments due to reduced friction of the rack relative to the housing. Moreover, a pay load may be increased from 40 to 50 percent in certain manipulator applications. Other advantages including smaller incremental increase in size and weight of the actuator are obtained in the same improvement in torque as compared to the alternative of increasing the actuator displacement factor.

What is claimed is:

1. In a power driven device utilizing hydraulic pressure to produce rotary motion, in combination, walls forming a hydraulic chamber, a hydraulically driven piston within the chamber and having an elongated body portion extending from one side of the piston head which body portion has a surface in sliding engagement with the wall of the chamber, the body portion having a gear rack on the side of the body portion opposite the surface and extending substantially longitudinally of the chamber, a pinion engaging the rack and being mounted on a drive shaft extending through the wall, whereby linear motion of the piston and rack causes rotation of the drive shaft, a first hydraulic conduit communicating with the chamber on one side of the piston and a second conduit communicating with the chamber on the other side of the piston, a control valve communicating with the first and second conduits for alternately admitting and venting hydraulic fluid from a source of pressurized hydraulic fluid to either of the portions of the chamber on opposite sides of the piston, one of the body portion and chamber wall having a recess facing the other of the body portion and chamber wall in said sliding engagement area, the improvement comprising third conduit means including a third conduit and communicating with the recess for introducing a lubricant fluid into the recess, the third conduit means including a lubricant control chamber having one end communicating with the first hydraulic conduit, the third conduit means also including a valve chamber and a spool valve within the valve chamber, one end of said spool valve being within said control chamber, a preloaded spring in the end of the valve chamber remote from said one end and engageable with one end of the spool valve, the spool valve having spaced lands and being movably responsive to the pressurized hydraulic fluid for controlling admission of lubricant to the recess, the portion of the spool valve between the lands communicating with the third conduit, and a fluid-restrictive passage in the third conduit between the spool valve and the recess which passage has a diameter substantially less than that of the third conduit, whereby the interface between the piston body portion and the chamber wall is hydrostatically lubricated and any accompanying backlash is greatly minimized.

* * * * *